(12) United States Patent
Eriksson

(10) Patent No.: US 7,592,592 B2
(45) Date of Patent: Sep. 22, 2009

(54) NIGHT VISION ARRANGEMENT

(75) Inventor: Dick Eriksson, Alingsås (SE)

(73) Assignee: Autoliv Development AB, Vargarda (SE)

( * ) Notice: Subject to any disclaimer, the term of this patent is extended or adjusted under 35 U.S.C. 154(b) by 350 days.

(21) Appl. No.: 10/512,391

(22) PCT Filed: Apr. 23, 2002

(86) PCT No.: PCT/SE02/00785

§ 371 (c)(1), (2), (4) Date: Feb. 13, 2006

(87) PCT Pub. No.: WO03/091069

PCT Pub. Date: Nov. 6, 2003

(65) Prior Publication Data

US 2006/0209182 A1  Sep. 21, 2006

(51) Int. Cl.
*H01L 31/0232* (2006.01)
(52) U.S. Cl. .................................. 250/330; 250/353
(58) Field of Classification Search ................ 250/330, 250/331, 332, 333, 334, 353
See application file for complete search history.

(56) References Cited

U.S. PATENT DOCUMENTS

| | | | | |
|---|---|---|---|---|
| 3,641,613 | A * | 2/1972 | Povilaitis et al. | 15/250.02 |
| 5,414,439 | A * | 5/1995 | Groves et al. | 345/7 |
| 5,479,016 | A * | 12/1995 | Curry et al. | 250/334 |
| 5,619,036 | A | 4/1997 | Salvio et al. | |
| 6,274,868 | B1 * | 8/2001 | Hall et al. | 250/332 |
| 6,347,010 | B1 * | 2/2002 | Chen et al. | 359/402 |
| 6,384,741 | B1 * | 5/2002 | O'Leary, Sr. | 340/937 |
| 6,388,566 | B1 * | 5/2002 | Perlo et al. | 340/436 |
| 7,092,007 | B2 * | 8/2006 | Eguchi et al. | 348/148 |
| 2002/0001198 | A1 | 1/2002 | Eschler et al. | |
| 2007/0200064 | A1 * | 8/2007 | Remillard et al. | 250/330 |
| 2008/0043105 | A1 * | 2/2008 | Kallhammer et al. | 348/148 |

FOREIGN PATENT DOCUMENTS

| | | |
|---|---|---|
| DE | 39 42 249 A1 | 7/1990 |
| EP | 0 677 955 A2 | 10/1995 |
| EP | 0 758 834 A2 | 2/1997 |
| EP | 758834 A2 * | 2/1997 |
| GB | 1142910 | 2/1969 |
| JP | 06064479 A | 3/1994 |
| JP | 07043209 A | 2/1995 |
| JP | 08009224 A | 1/1996 |
| JP | 10264724 A | 10/1998 |
| JP | 2000062653 A | 2/2000 |
| JP | 2000264128 | 9/2000 |
| JP | 2001039218 A | 2/2001 |

(Continued)

*Primary Examiner*—David P Porta
*Assistant Examiner*—David S Baker
(74) *Attorney, Agent, or Firm*—Brinks Hofer Gilson & Lione

(57) ABSTRACT

A night vision arrangement for a vehicle incorporating a camera. The camera comprises a window which is substantially transparent to infra-red light, a lens separate from the window, and an infra-red sensor to capture an image received through the window. A beam deflector is provided in alignment with the window to deflect a beam received through the window and directs the deflected beam through the lens on to the sensor. A display unit is provided to display the captured image to a driver of the vehicle.

18 Claims, 6 Drawing Sheets

FOREIGN PATENT DOCUMENTS

| | | |
|---|---|---|
| JP | 2001058543 A | 3/2001 |
| JP | 2001233139 A | 8/2001 |
| WO | WO 00/18972 | 4/2000 |
| WO | WO 00/68910 | 11/2000 |
| WO | WO 01/63335 A2 | 8/2001 |
| WO | WO 0163335 A2 * | 8/2001 |
| WO | WO 0205013 A2 * | 1/2002 |
| WO | WO 02/34572 A1 | 5/2002 |

* cited by examiner

NIGHT VISION ARRANGEMENT

CROSS REFERENCE TO RELATED APPLICATION

This application claims priority to PCT/SE02/00785, filed Apr. 23, 2002.

BACKGROUND OF THE INVENTION

The present invention relates to a night vision arrangement in the form of a device for the enhancement of night vision of a vehicle, such as an automobile.

It has been proposed previously to provide a night vision arrangement in an automobile. U.S. Pat. No. 5,414,439 discloses an arrangement in which a vehicle is equipped with an infra-red sensitive camera which is directed to capture an image of the roadway in front of the vehicle. The camera provides an output in the form of a video signal which is processed by a video processor, and which is then passed to a head-up display. It has been known previously to provide head-up display units in vehicles such as combat aircraft to enable the pilots of the aircraft to view, simultaneously, the scene on the exterior of the aircraft, and also an image projected on to the head-up display. U.S. Pat. No. 5,414,439 utilises a head-up display of this general type to enable the driver of the vehicle to view the road in front of the vehicle and, simultaneously, to see an image derived from the infra-red camera.

In the arrangement of U.S. Pat. No. 5,414,439, the windshield is provided with a semi-transparent mirror which is utilised as a combiner to combine the real image of the road in front of the vehicle as viewed by the driver, and a virtual image of the road ahead.

The infra-red sensitive camera of U.S. Pat. No. 5,414,439 is of conventional design incorporating a lens arrangement which serves to focus an image on a relatively large sensor element which is located in alignment with the optical axis of the lens arrangement. The entire camera is rather bulky and the positioning of the camera is shown, schematically, with the camera being mounted within the engine compartment of the vehicle.

The present invention seeks to provide an improved night vision arrangement.

SUMMARY OF THE INVENTION

According to the invention there is provided a night vision arrangement for a vehicle, the night vision arrangement incorporating a camera, the camera comprising a non-distorting window which is substantially transparent to infra-red light and a separate lens, and an infra-red sensor to capture an image received through the window, therebeing a display unit to display the captured image to a driver of the vehicle, characterized in that within the camera a beam deflector is provided in alignment with the window to deflect a beam received through the window and to direct the deflected beam through said lens on to the said sensing means.

Preferably the beam deflector is adapted to deflect the beam through approximately 90°. The angle of deflection of the beam deflected by the beam deflector does depend upon the detailed design of the camera, and the intended location of the camera. It is intended that the camera should be mounted in position with only the window exposed.

Conveniently the beam deflector comprises a mirror. Alternatively the beam deflector may comprise a prism or some other optical unit which deflects the beam.

Preferably the deflector and lens are located within a sealed housing, the housing being provided with said window.

Conveniently the lens is provided with a hard coated exterior surface which is coated with micro diamond. This may ensure that the lens proves to be durable, especially if the arrangement is used in a harsh environment where there is grit or dust in the air.

Advantageously a part of the camera containing the sensor is mounted within the envelope of the vehicle, with the window being positioned or positionable on the exterior of the vehicle. If the main part of the camera, which contains the sensor, is mounted within the envelope of the vehicle, the aerodynamic property of the vehicle will not be influenced substantially by the camera arrangement. Also, the mounting of the camera in position, during the assembly of the vehicle, may be facilitated.

Conveniently means are provided to heat the window of the camera. This may minimize any problems that might otherwise arise due to condensation.

Preferably means are provided for rinsing the window with water. The means for rinsing the window with water may comprise a windscreen washer arrangement. The rinsing of the window with water may assist in keeping the window clean.

Conveniently means are provided to wipe the window. The means to wipe the window may comprise a wiper blade, a mechanism being provided to effect a relative movement between the window and the wiper blade.

Advantageously means are provided to protect the window from the environment. Thus the window may be protected from the environment at times when the night vision arrangement is not in use.

In one embodiment the means provided to protect the window from the environment comprise a cover movable to a position in which the window is covered.

In another embodiment the means to protect the window comprise means to move the camera and the window so that the window is in a retracted and protected position.

In one preferred embodiment the camera is mounted between the rear of the hood of a motor vehicle and the windshield.

Preferably the camera is mounted in position for pivotal movement about a horizontal axis parallel with the axis of the vehicle between an operative position and a retracted position, a wiper being provided to wipe the window as the camera moves.

In an alternative embodiment the camera is incorporated into a mirror housing.

In another modified embodiment the camera is mounted in a fender or bumper.

Conveniently the camera is mounted to be moved vertically between an operative position and a retracted position.

Alternatively the camera is provided with a cover movable between a retracted position in which the window is exposed, and a closed position in which the window is covered.

In another embodiment of the invention the camera is adapted to be mounted on the roof of a vehicle.

Conveniently the cover is incorporated in a roof rail.

BRIEF DESCRIPTION OF THE DRAWINGS

In order that the invention may be more readily understood, and so that further features thereof may be appreciated, the invention will now be described by way of example, with reference to the accompanying drawings in which.

DETAILED DESCRIPTION OF THE INVENTION

Figure 1:
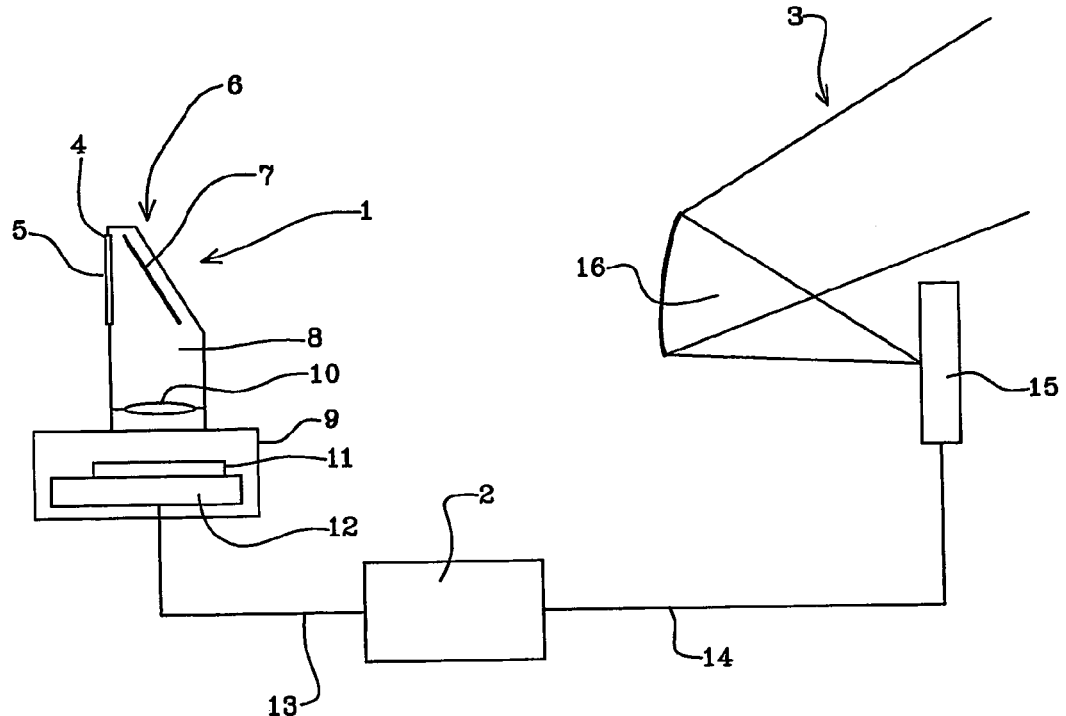
FIG. 1 is a schematic illustration of a night vision arrangement for a motor vehicle in accordance with the invention.

Referring initially to FIG. 1 of the accompanying drawings, a night vision arrangement for a vehicle such as a motor car comprises a camera arrangement 1 to capture an image, a signal processing unit 2 and a display arrangement 3 adapted to display an image.

The camera arrangement 1 comprises a window 4 which is transparent to the infra-red light through which a beam of infra-red light, forming an image, is to pass into the interior of the camera. The window is such that it does not distort the beam of infra-red light, and does not refract or diffract the beam. Thus the window does not focus the beam. The window 4 is provided with a flat front face, that flat front face being provided with a hard coating 5 formed preferably of microsize diamond.

The window 4 is perpendicular to an optical axis, and, when the camera unit 1 is positioned on the motor vehicle, the optical axis in front of the window is directed towards the roadway in front of the vehicle, so that the camera can capture an image of the roadway in front of the vehicle.

Behind the window 4, in alignment with the window, there is a beam deflector 6 which, in the illustrated embodiment of the invention, is constituted by a mirror 7 which is inclined at substantially 45° to the optical axis. Thus the beam deflector 6 serves to deflect the beam passing through the window 4 by approximately 90°.

The beam deflector 6 is connected, by means of an elongate hollow neck 8, to a main part of the housing 9 of the camera 1. Contained within the elongate neck 8 is a focusing lens 10, which serves to focus light from the beam deflector 6 on to a sensor 11 present within the main part of the housing 9. The sensor 11 is an infra-red sensor, and may comprise a microbolometer. The sensor may be a charge-coupled device. The sensor is shown mounted on a electronic unit 12 which receives the signals from the sensor and which provides an output on the output lead 13.

It is to be understood, therefore, that the infra-red sensitive camera 1 is provided with a housing 9 which contains an infra-red sensor 11 which is adapted to capture an image, and the housing has a hollow neck 8 extending to a beam deflector 6 which is located adjacent the window 4. The housing is sealed to prevent the ingress of dirt or moisture.

In an alternative arrangement, the window may be formed by one face of a prism that acts as the beam deflector.

The output 13 from the camera 1 passes through a signal processor unit 2 which provides a signal on the lead 14 which passes to an image generator 15. The image generator 15 may be a cathode ray tube device, or some other equivalent arrangement. The image generator 15 is positioned at an appropriate location generally in front of a combiner 16, which may be mounted on the windshield of a motor vehicle, and which may be a semi-transparent aspheric mirror.

In use of the arrangement, as shown in FIG. 1, the camera 1 will be mounted in a motor vehicle so that the optical axis which is perpendicular to the window 4 is directed generally along the roadway in front of the motor vehicle, enabling the camera 1 to generate an infra-red image of the roadway in front of the vehicle. That image is presented on the image generator 15. The driver of the vehicle may thus simultaneously view, in the combiner 16, the real image of the roadway outside the vehicle, and a virtual image of the roadway, as presented on the image generator 15.

Figure 2:
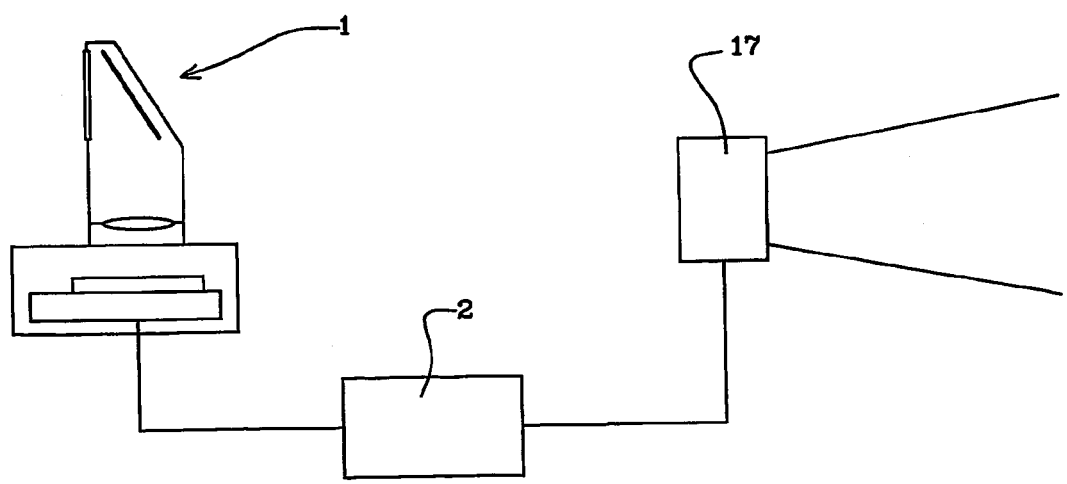
FIG. 2 is a view similar to that of FIG. 1 illustrating a modified embodiment of the invention.

FIG. 2 illustrates a second embodiment of the invention in which the camera 1 and signal processor unit 2 are exactly as described above with reference to FIG. 1. These components will not be re-described. In this embodiment the output 14 of the signal processing unit 2 is connected directly to a monitor 17, which may be in the form of a cathode ray tube or the like. The monitor 17 is located at a position where it can be viewed by the driver of a motor vehicle.

Figure 3:
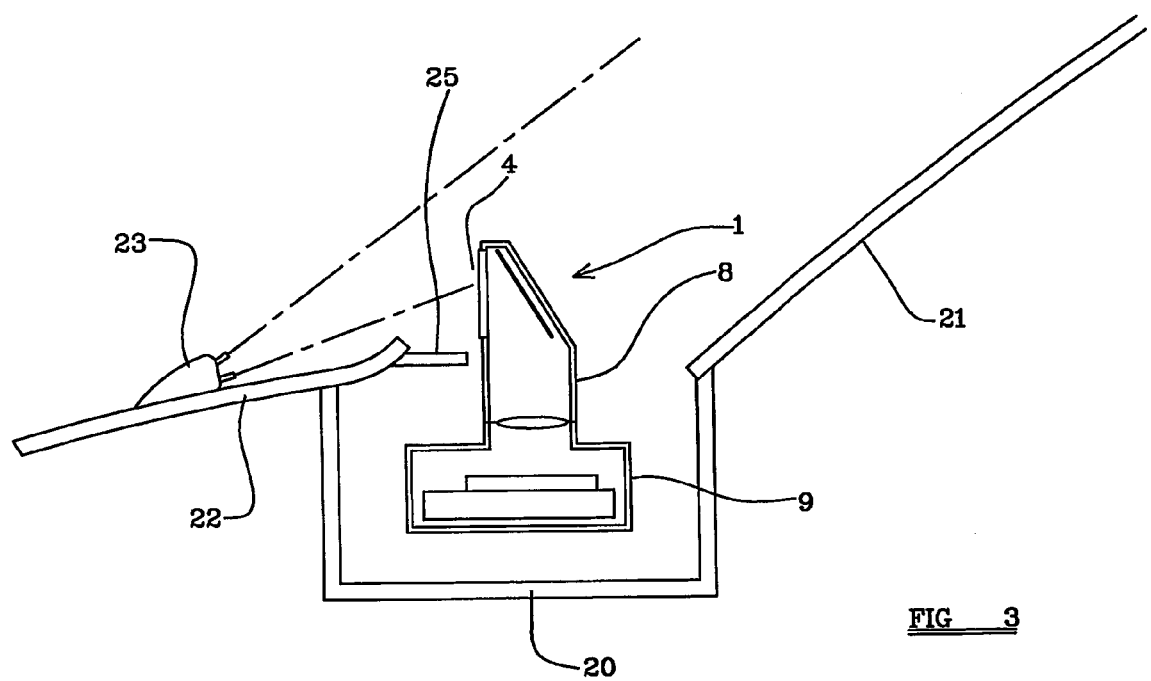
FIG. 3 is a diagrammatic side view illustrating a camera of one embodiment of the invention mounted in position on a motor vehicle.
Figure 4:
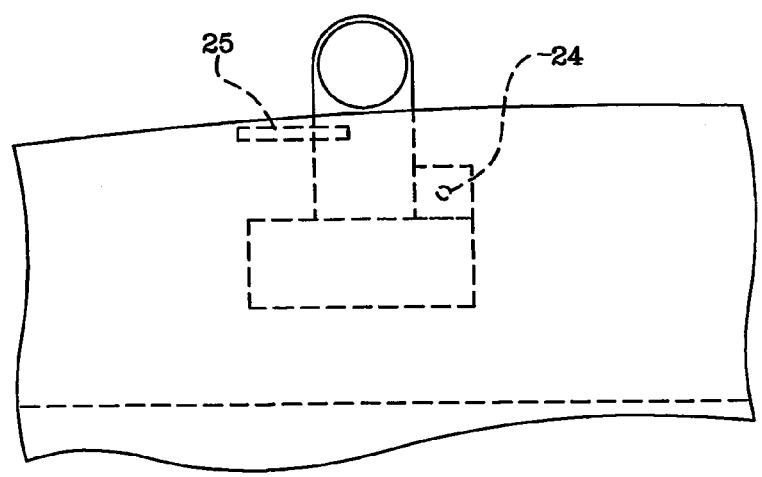
FIG. 4 is a front view of the camera of FIG. 3 in the operative position.
Figure 5:
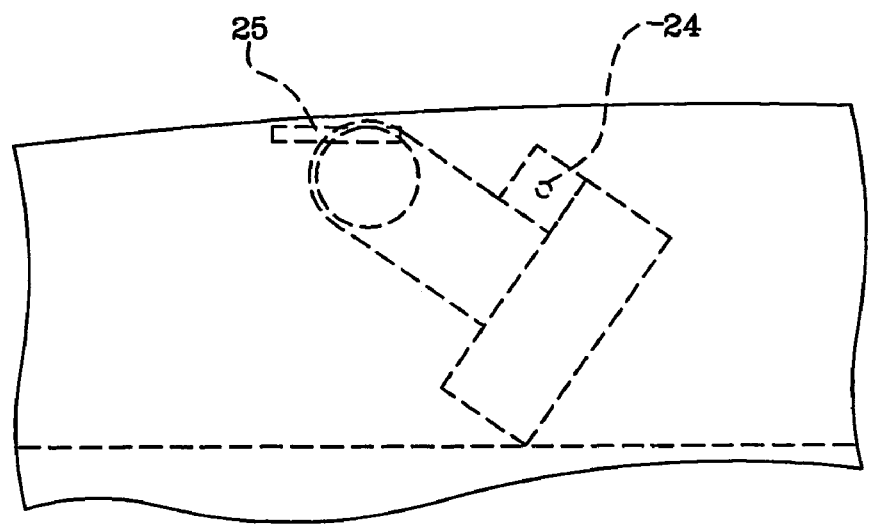
FIG. 5 is a front view corresponding to FIG. 4 illustrating the camera of FIG. 3 in a non-operative position.

Referring now to FIGS. 3 to 5, a camera 1, as described above, is illustrated mounted in position on a motor vehicle. The internal components of the camera are not shown in these figures.

Referring initially to FIG. 3, the camera 1 is mounted in position with the main housing 9 being located within a recess 20 that is formed between the lower edge of the windscreen 21, and the upper edge of the hood or bonnet 22. The recess 20 may also contain part of the windscreen wiper mechanism.

The camera 1 is located in position so that the main housing 9 is located within the recess, with the neck 8 extending vertically upwardly, so that the window 4 is located above the upper edge of the bonnet 22, thus ensuring that the window 4 has adequate "view" of the road in front of the vehicle. The main housing 9 is thus located within the main envelope defined by the vehicle, with only that part of the neck 8 carrying the window 4 projecting beyond the envelope.

Mounted on the bonnet 22 is a windscreen washer nozzle 23. The windscreen washer nozzle 23 is located so that when the windscreen washer is actuated, water from the nozzle 23 will impinge upon the window 4, thus facilitating in cleaning the window 4.

The camera 1 of the embodiment shown in FIGS. 3 to 5, is mounted in position for pivotal movement about a substantially horizontal pivot axis 24, the pivot axis being aligned with the axis of the vehicle. The entire camera may thus pivot from a first operative position, as shown in FIGS. 3 and 4, in which the window 4 is located above the rear edge of the bonnet 22, to a retracted position, as shown in FIG. 5, in which the lens is positioned beneath the rear edge of the hood or bonnet 2. The lens, in this retracted position, is somewhat protected from the environment which may contain rain or dust.

It is to be appreciated that in the embodiment of FIGS. 3 to 5, the main housing 9 of the camera 1 is, at all times, within the envelope of the vehicle, with the window 4 being movable to the operative position where it extends beyond the envelope of the vehicle. The optical axis of the window 4, when the camera is in the operative position, is very close to the actual line of sight of the driver of the vehicle, if the camera is positioned immediately in front of the driver. This serves to minimize any parallax error which might otherwise arise.

The camera of the embodiment of FIGS. 3 to 5 may be driven about the pivot axis 24 by means of an appropriate electric or hydraulic motor. The motor may be controlled so that the camera is only moved to the operative position when the night vision arrangement is actuated, although the driver may have a control which can be actuated to cause the camera to move from the operative position to the retracted position, and back again, so that the driver may effect a cleaning of the lens of the camera.

Figure 6:
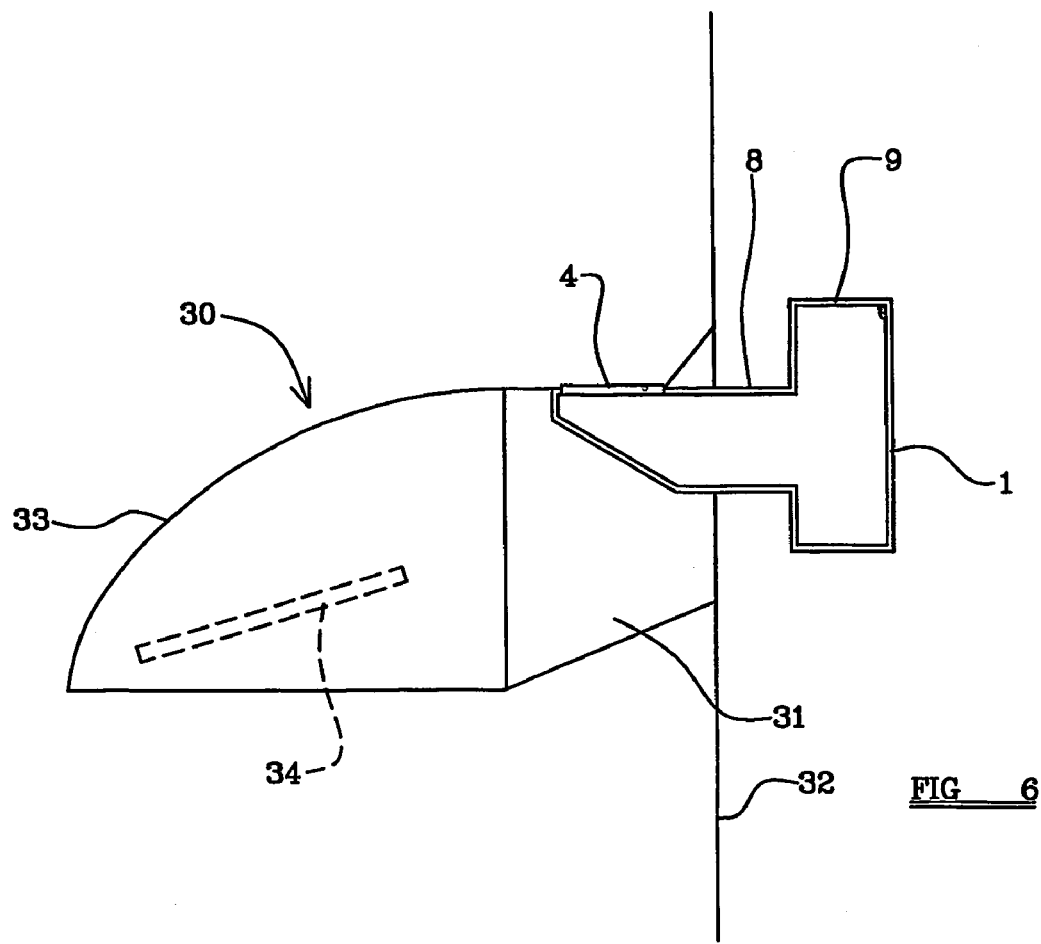
FIG. 6 is a diagrammatic view illustrating a camera of another embodiment of the invention.

FIG. 6 illustrates another embodiment of the invention in which a camera 1 as described above is mounted in a motor vehicle, with the camera being mounted in position to form part of a wing mirror unit 30. Again, the internal components of the camera are not shown. The wing mirror 30 has a base portion 31 connected to part 32 of the door of a vehicle, and has an extension portion 33 which contains the actual mirror 34. In this embodiment the camera 1 is mounted in position with the main housing 9 being located within the door, and the neck 8 extending horizontally into the base portion 31 of the wing mirror unit 30. The window 4 is positioned in an appropriate aperture formed in the forward facing part of the base portion 31 of the wing mirror unit 30. The camera may easily be mounted in this position as the motor vehicle is fabricated.

Figure 7:
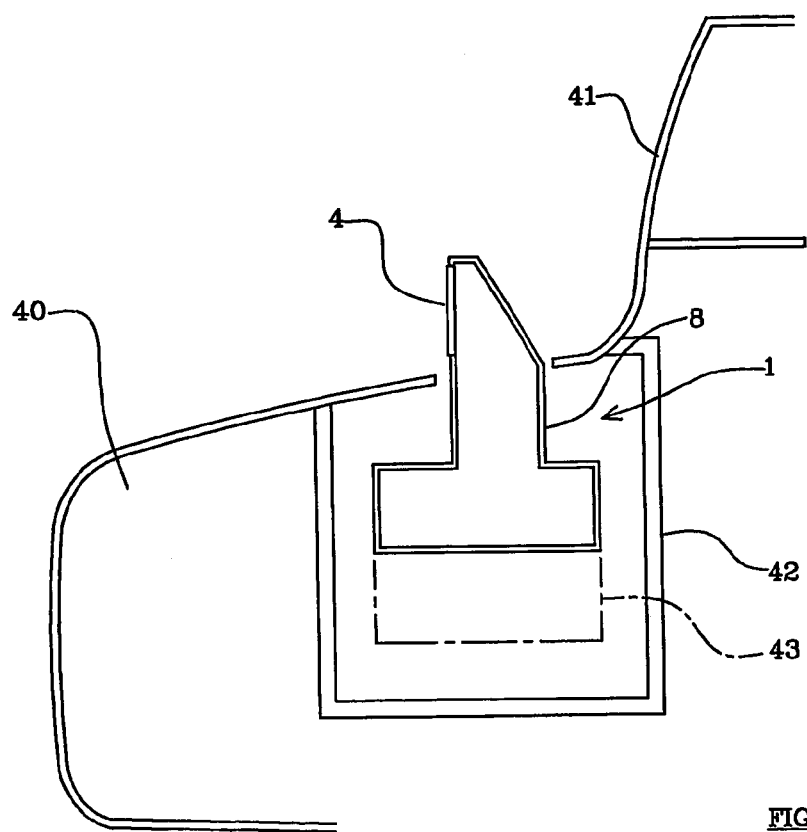
FIG. 7 is a diagrammatic vie illustrating the camera of yet another embodiment of the invention.

Referring now to FIG. 7 of the accompanying drawings, a camera 1 of the type described above is shown mounted in position within the bumper or fender 40 of the motor vehicle. Again, the internal components of the camera are not shown. The camera 1 is shown in position beneath a headlight 41. The camera is mounted in position within a recess 42 formed in the bumper or fender with the housing 9 within the envelope of the vehicle. The camera is located in position with the neck 8 extending vertically upwardly so that the window 4 is positioned immediately above the top surface of the bumper or fender 40. Preferably the camera is positioned immediately in front of the driver in order to minimize any parallax problems. In the illustrated embodiment, the camera may move vertically from an upper or elevated position, as shown in solid line, to a lower or retracted position as shown in dotted lines 43. When the camera is in the lower position the window 4 is retracted into the recess 42 formed in the bumper or fender 40, thus protecting the window 4 from the environment.

Figure 8:
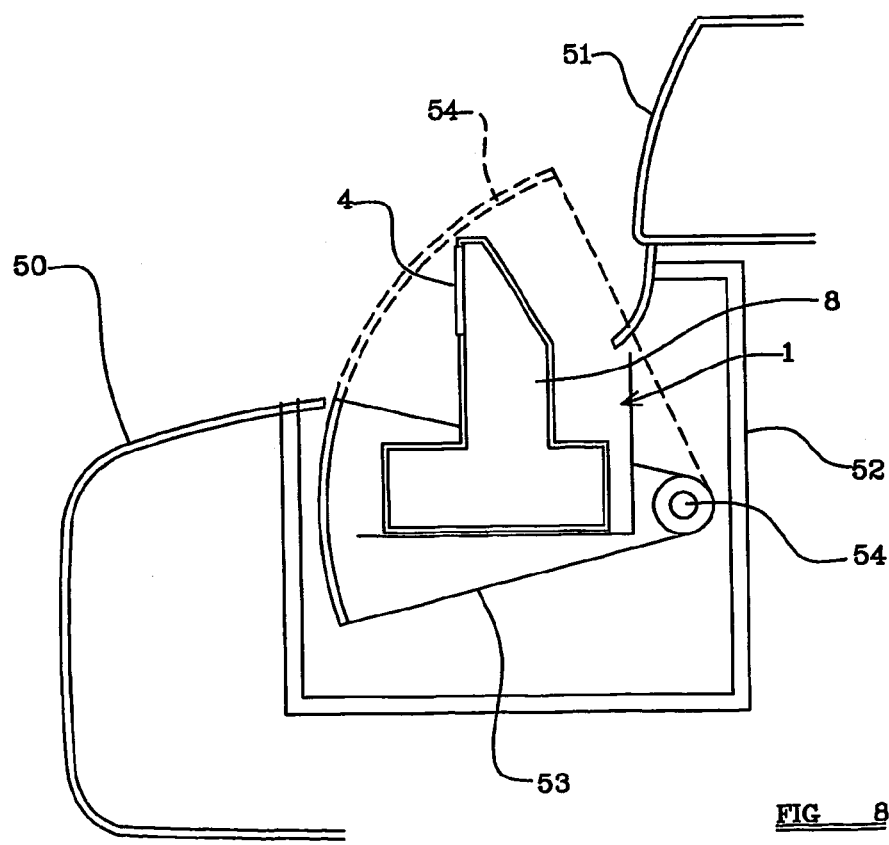
FIG. 8 is a diagrammatic side view illustrating the camera of a further embodiment of the invention.

FIG. 8 illustrates a further embodiment in which a camera 1 of the type described above is mounted in position within a bumper or fender 50, and in this figure the internal components of the camera are not shown. Again, the camera 1 is located adjacent a headlight 51. In this embodiment of the invention, the bumper or fender 50 defines a recess 52, and the camera 1 is mounted at a fixed position within the recess 52, with the housing 9 within the envelope of the vehicle. The neck 8 of the camera extends upwardly so that the window 4 is positioned above the upper edge of the bumper or fender. Mounted within the bumper or fender is a pivotally movable cover 53. The cover 53 is adapted to pivot about a pivot axis 54. The cover may move from a retracted position, as shown in solid lines in FIG. 8, in which the window 4 is exposed and has a clear view across the top part of the bumper or fender 50, to a closed position, as shown in dotted lines in FIG. 8, in which the cover 53 extends in front of and above the window to cover and protect the window 4.

Figure 9:
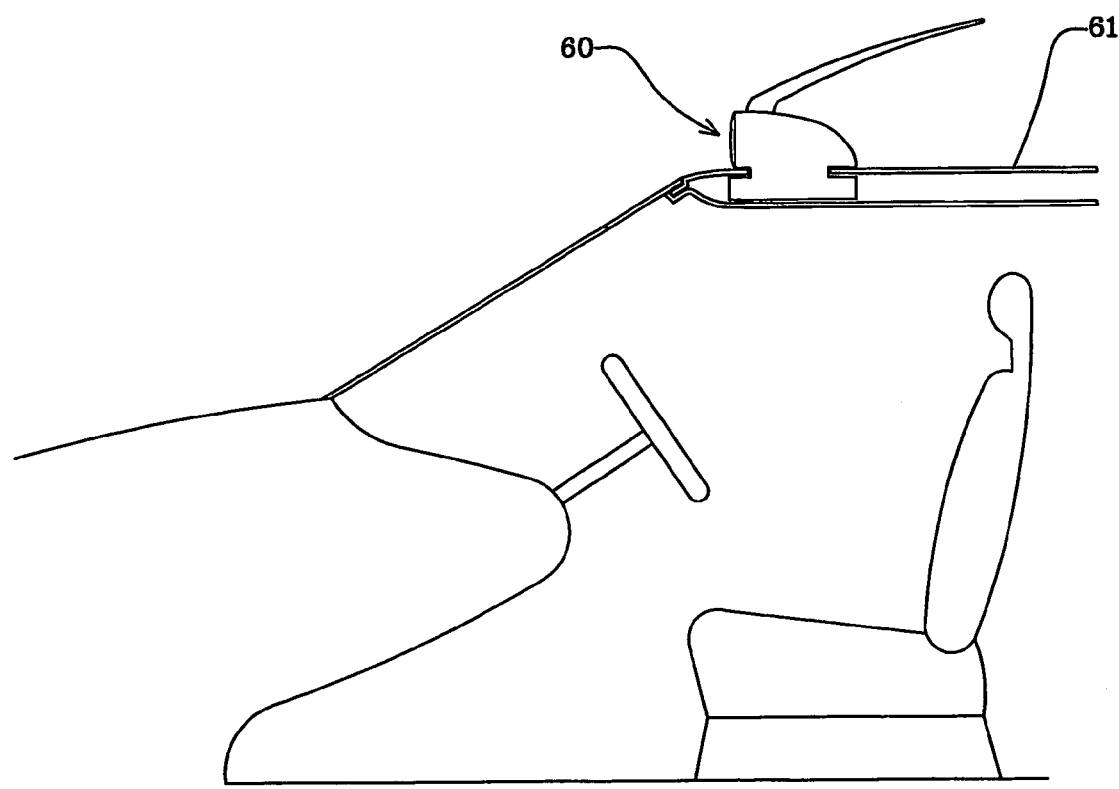
FIG. 9 is a diagrammatic side view of part of a motor vehicle provided with a camera forming part of the embodiment of the invention.
Figure 10:
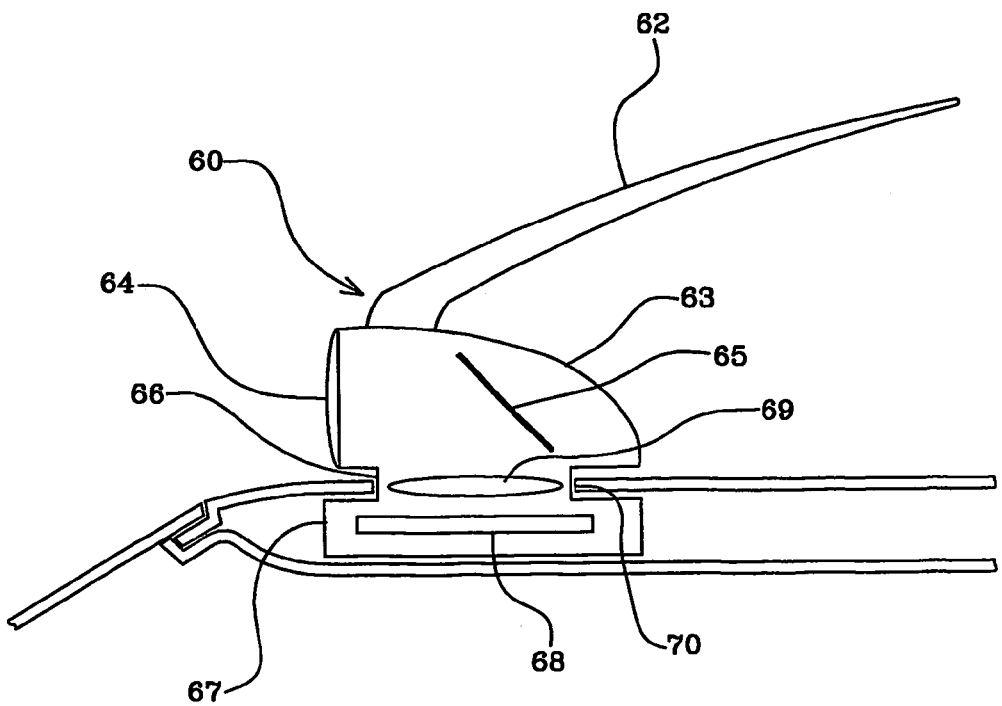
FIG. 10 is an enlarged view of part of FIG. 9.

Reference is now made to FIGS. 9 and 10 of the accompanying drawings in which an aerial unit 60 is shown mounted on the roof 61 of a motor vehicle. The internal components of the aerial unit are not shown in FIG. 9. The aerial unit 60 incorporates an aerial or antenna 62 mounted on an upper housing 63. The front part of the upper housing 63 is provided with a window 64, similar to the window 4 of the camera described above, the window 64 being perpendicular to an optical axis aligned with a beam deflector 65 contained within the upper housing 63. The upper housing 63 is connected by means of a neck 66 which extends from the lower part of the upper housing 63, to a lower housing 67. Contained within the lower housing 67 is an image detector 68, corresponding to the image detector 11 described above. A focusing lens 69 is positioned between the beam deflector 65 and the image deflector 68. The beam deflector 65 deflects the beam entering the camera through the window 4 by approximately 90° so that the deflected beam passed through the lens 69 and is focused on to the image detector 68. Thus the upper housing 63 and the lower housing 67 together constitute a camera which is, effectively, of the same operative design as the camera 1 described above. It is to be noted that the camera of the embodiments of FIGS. 9 and 10 is mounted in position with the neck 66 passing through an aperture 70 formed in the roof sheet of the vehicle. Thus the lower housing 67, containing the sensor 68, is mounted within the envelope of the vehicle. The lower housing 67 is larger than the aperture 70, and so the aerial unit 60 cannot easily be removed from the vehicle.

Figure 11:
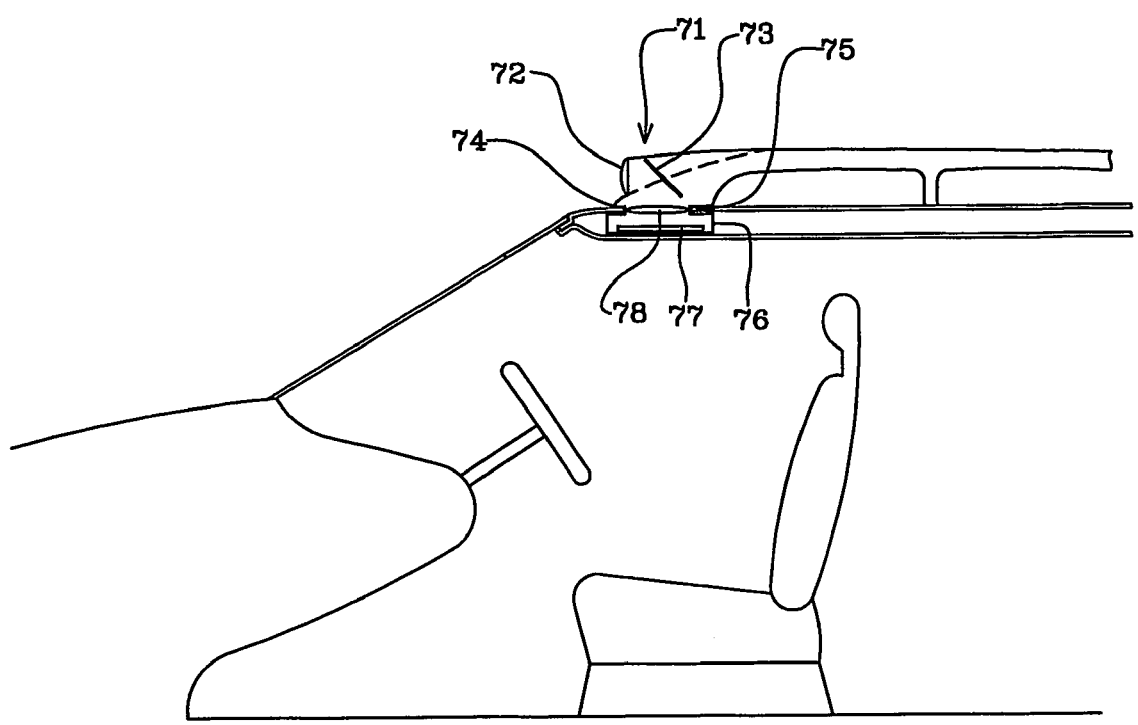
FIG. 11 is a side view of part of a vehicle provided with a camera forming part of yet another embodiment of an invention.

FIG. 11 illustrates a further embodiment of the invention in which a camera is incorporated within a roof rail of the motor vehicle. Referring to FIG. 11, a roof rail 70 of a motor vehicle has, at its forward-most end, a chamber 71, the front part of the chamber being provided with a window 72. The window 72 corresponds with the window 4 as described above. Contained within the chamber 71 in alignment with the optical axis of the lens 4 is a beam deflector constituted, in this embodiment, by an inclined mirror 73. The lower part of the chamber 71 is connected, by means of a relatively narrow neck 74 which passes through an aperture 75 formed in the roof of the vehicle, the neck 74 terminating in an enlarged lower housing 76 which contains an infra-red sensor 77 of the type described above. The beam entering the camera through the window 72 is focused onto the infra-red sensor by a lens 78 located between the mirror 73 and the sensor 77. It is to be appreciated that in this embodiment the housing containing the sensor is within the envelope of the vehicle.

In all of the described embodiments of the invention, a heater may be provided to heat the window of the camera to minimize or obviate condensation on the window. The heater may be an electric heater or may be means to direct heated air from the vehicle heating system on to the window.

While the above description constitutes the preferred embodiment of the present invention, it will be appreciated that the invention is susceptible to modification, variation and change without departing from the proper scope and fair meaning of the accompanying claims.

The invention claimed is:

1. A night vision arrangement for an automotive vehicle, the night vision arrangement incorporating a camera, the camera comprising a window which is substantially transparent to infra-red light, a lens separate from the window, an infra-red sensor to capture an image received through the window, a beam deflector provided in alignment with the window to deflect a beam received through the window and to direct the deflected beam through the lens onto the sensor and a display unit to display the captured image to a driver of the vehicle, wherein a part of the camera containing the infra-red sensor is mounted within a main envelope defined by the vehicle, and the window, when in an operative position, is projected beyond the main envelope, wherein means are provided for protecting the window from the environment, the means for protecting the window comprising means for moving the camera so that the lens is moveable to a retracted and protected position.

2. An arrangement according to claim 1 wherein the beam deflector is adapted to deflect the beam through approximately 90°.

3. An arrangement according to claim 2 wherein the beam deflector comprises a mirror.

4. An arrangement according to claim 1 wherein the beam deflector and the lens are located within a sealed housing, the housing being provided with the window.

5. An arrangement according to claim 1 wherein the window is provided with a hard coated exterior surface which is coated with micro diamond.

6. An arrangement according to claim 1 wherein means are provided for heating the window of the camera.

7. An arrangement according to claim 1 wherein means are provided for rinsing the window with water.

8. An arrangement according to claim 1 wherein means are provided for wiping the window.

9. An arrangement according to claim 1 wherein the means provided for protecting the window from the environment further comprises a cover movable to a position in which the window is covered.

10. An arrangement according to claim 1 wherein the camera is mounted between the rear of a hood of the vehicle and a windshield of the vehicle.

11. An arrangement according to claim 1 wherein the camera is incorporated into a vehicle rear-view mirror housing.

12. An arrangement according to claim 1 wherein the camera is mounted in a fender or bumper of the vehicle.

13. An arrangement according to claim 1 wherein the camera is provided with a cover movable between a retracted cover position in which the window is exposed and a closed position in which the window is covered.

14. An arrangement according to claim 1 wherein the camera is adapted to be mounted on a roof of the vehicle.

15. An arrangement according to claim 14 wherein the camera is incorporated in a roof mounted aerial.

16. An arrangement according to claim 14 wherein the camera is incorporated in a roof rail.

17. A night vision arrangement for an automotive vehicle, the night vision arrangement incorporating a camera, the camera comprising a window which is substantially transparent to infra-red light, a lens separate from the window, an infra-red sensor to capture an image received through the window, a beam deflector provided in alignment with the window to deflect a beam received through the window and to direct the deflected beam through the lens onto the sensor and a display unit to display the captured image to a driver of the vehicle, wherein a part of the camera containing the infra-red sensor is mounted within a main envelope defined by the vehicle, and the window, when in an operative position, is projected beyond the main envelope wherein the camera is mounted in position for pivotal movement about a horizontal axis parallel with the axis of the vehicle between the operative position and a retracted position.

18. A night vision arrangement for an automotive vehicle, the night vision arrangement incorporating a camera, the camera comprising a window which is substantially transparent to infra-red light, a lens separate from the window, an infra-red sensor to capture an image received through the window, a beam deflector provided in alignment with the window to deflect a beam received through the window and to direct the deflected beam through the lens onto the sensor and a display unit to display the captured image to a driver of the vehicle, wherein a part of the camera containing the infra-red sensor is mounted within a main envelope defined by the vehicle, and the window, when in an operative position, is projected beyond the main envelope, wherein the camera is mounted to the vehicle to be moved vertically between the operative position and a retracted position.

\* \* \* \* \*